United States Patent
Lee et al.

(10) Patent No.: US 7,513,943 B2
(45) Date of Patent: Apr. 7, 2009

(54) YELLOW DYE COMPOUND AND INK COMPOSITION COMPRISING THE SAME

(75) Inventors: Chien-Wen Lee, Taoyuan Hsien (TW); Shih-Hung Wang, Taoyuan Hsien (TW); Feng-Hung Lo, Taoyuan Hsien (TW); Tzu-Kwei Sun, Taoyuan Hsien (TW)

(73) Assignee: Everlight USA, Inc., Pineville, NC (US)

( * ) Notice: Subject to any disclaimer, the term of this patent is extended or adjusted under 35 U.S.C. 154(b) by 35 days.

(21) Appl. No.: 11/976,349

(22) Filed: Oct. 24, 2007

(65) Prior Publication Data

US 2009/0056586 A1   Mar. 5, 2009

(30) Foreign Application Priority Data

Aug. 27, 2007   (CN) .................. 2007 1 0147944

(51) Int. Cl.
  *C09D 11/00* (2006.01)
  *C09B 29/36* (2006.01)
(52) U.S. Cl. ..................... 106/31.5; 534/780
(58) Field of Classification Search ............... 106/31.5; 534/780
  See application file for complete search history.

(56) References Cited

U.S. PATENT DOCUMENTS

| | | | | |
|---|---|---|---|---|
| 2,512,251 A * | 6/1950 | Kleene | .................. | 534/780 |
| 2,715,120 A * | 8/1955 | Buehler et al. | .............. | 534/780 |
| 3,802,836 A * | 4/1974 | Speck | .................. | 534/780 |
| 3,905,952 A * | 9/1975 | Speck | .................. | 534/780 |
| 3,958,930 A * | 5/1976 | Speck | .................. | 534/780 |
| 4,119,622 A * | 10/1978 | Baumann et al. | ............ | 534/780 |
| 5,413,630 A * | 5/1995 | Schwarz et al. | ............ | 106/31.5 |
| 5,457,188 A * | 10/1995 | Zimmermann | ............. | 534/780 |
| 5,542,972 A * | 8/1996 | von der Eltz et al. | ....... | 106/31.5 |
| 5,622,550 A * | 4/1997 | Konishi et al. | ............. | 106/31.5 |
| 5,744,590 A * | 4/1998 | Chorlton et al. | ............. | 534/780 |
| 5,746,821 A * | 5/1998 | Hays | .................. | 106/496 |
| 5,997,628 A * | 12/1999 | Bindra | .................. | 106/31.5 |

* cited by examiner

*Primary Examiner*—Helene Klemanski
(74) *Attorney, Agent, or Firm*—Bacon & Thomas, PLLC

(57) ABSTRACT

A yellow dye compound having a structure of following formula (I) is disclosed:

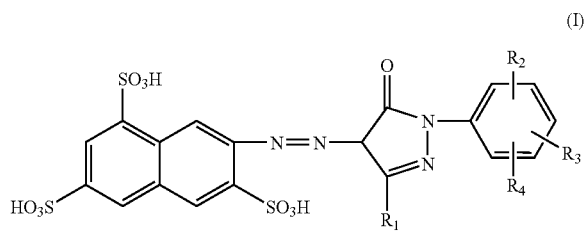

wherein $R_1$, $R_2$, $R_3$, and $R_4$, is defined the same as in the specification. The yellow dye compound can be used in ink-jet ink. Also disclosed is a yellow ink composition including the yellow dye compound having the above formula (I).

14 Claims, No Drawings

YELLOW DYE COMPOUND AND INK COMPOSITION COMPRISING THE SAME

BACKGROUND OF THE INVENTION

1. Field of the Invention

The present invention relates to a yellow dye compound, and more particularly, to a yellow dye compound especially applied to ink-jet ink. The present invention also relates to a yellow ink composition comprising the above yellow dye compound.

2. Description of Related Art

Ink jet printing is a non-impact printing method, the involving features include and provide sharp, non feathering patterns, as well consist of good light-fastness, optical density, high solubility, storage stability, and fine fluency, so as to provide excellent printing quality.

Currently, there are several kinds of yellow dyes used in ink-jet ink, such as C.I. Reactive Yellow 95, C.I. Direct Yellow 86, C.I. Direct Yellow 132 and C.I. Acid Yellow 23. Also, in Taiwan Invention Patent No. 265181 and U.S. Pat. No. 6,867,286, yellow dyes for ink-jet ink are disclosed. However, these yellow dyes known in the conventional art have caused problems in deposition and blocking due to undesirable light-fastness and low solubility, and further, result in poor printing quality in terms of non-uniformness and discontinuity.

It is an important issue to provide a novel yellow dye, having desirable light-fastness and solubility, so that diversified selectiveness can be obtained in manufacturing yellow ink-jet ink.

SUMMARY OF THE INVENTION

The present invention relates to a novel yellow dye compound, and particularly to a yellow dye compound suitable for the use of ink-jet inks.

The yellow dye compound of the present invention has a structure of the following formula (I):

(I)

wherein, $R_1$ is —$CH_3$ or —COOH; each of $R_2$, $R_3$, and $R_4$, independently, is H, —Cl, —$SO_3H$, —$SO_2NH_2$ or —$SO_2CH_2CH_2OH$.

There are several embodiments provided for the yellow dye compound, with formula (I), of the present invention:

(I-1), (I-2), (I-3), (I-4), (I-5), (I-6), (I-7), (I-8)

In these examples, the compounds are expressed in the form of free acid. However, in practice, they may exist as metallic salts or ammonium salts, and more likely as alkaline metallic salts or ammonium salts.

The yellow dye compound of the present invention may further be formulated so as to form a yellow ink composition.

The yellow ink composition of the present invention comprises:

(A) a yellow dye compound of the following formula (I):

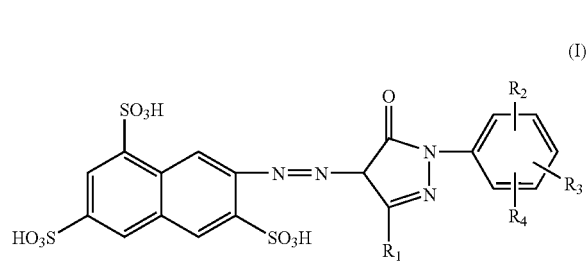

wherein, $R_1$ is —$CH_3$ or —COOH; each of $R_2$, $R_3$, and $R_4$, independently, is H, —Cl, —$SO_3H$, —$SO_2NH_2$ or —$SO_2CH_2CH_2OH$; wherein, the content of (A) a yellow dye compound is 0.1 to 35.0 wt %;

(B) an organic solvent, selected from the group consisting of ethylene glycol, diethylene glycol, triethylene glycol, propylene glycol, butylene glycol, ethylene glycol monoethyl ether, ethylene glycol monobutyl ether, diethylene glycol monobutyl ether, diethylene glycol monoethyl ether, diethylene glycol monomethyl ether, triethylene glycol monoethyl ether, triethylene glycol monobutyl ether, glycerine, 2-pyrrolidone, N-methyl-2-pyrrolidone, 1,3-dimethyl-2-imidazolidinone, and triethanolamine; wherein, the content of (B) an organic solvent is 5.0 to 35.0 wt %; and (C) water; wherein, the content of (C) the water is 30.0 to 94.9 wt %.

The yellow ink composition of the present invention may further comprise:

(D) a nonionic surfactant, the content of (D) the nonionic surfactant is 0.1 to 5.0 wt %. Suitable nonionic surfactant includes, for example, alkynediol-based surfactant or alkoxyl compound surfactant. Examples for alkynediol-based surfactant include: Surfynol 485, Surfynol 465, Surfynol 440, Surfynol 420, Surfynol 104 (by Air Products & Chemicals, Inc.). Examples for alkoxyl compound surfactant include: Tergitol 15-S-5, Tergitol 15-S-7, Tergitol 15-S-9 (by Union Carbide).

Depending on needs, the yellow ink composition of the present invention may further comprise (E) a buffer and/or a microbicide. Suitable examples of the buffer include: acetic acid, acetate salts, phosphoric acid, phosphate salts, borax, borate salts, or citrate salts. Examples for microbicide include: NUOSEPT (by Nudex Inc., a division of Huls Americas), UCARCIDE (by Union Carbide), VANCIDE (by RT Vanderbilt Co.) and PROXEL (by ICI Americas). The aforementioned additives have been disclosed in Taiwan Invention Patent No. 589,352 and U.S. Pat. No. 5,725,641, respectively. The content of the microbicide is generally 0.01 to 1.0 wt % based on a total weight of the ink.

DETAILED DESCRIPTION OF THE PREFERRED EMBODIMENTS

The yellow dye compound of the present invention can be prepared by using the method below. First, 2-naphthylamine-3,6,8-trisulphonic acid was dissolved in ice-cooled acid water, and then a sodium nitrite solution was added to proceed a diazo-reaction. A solution of 1-phenyl-3-methyl-5-pyazolone in water was added to the above diazo-reaction solution for coupling reaction, thus obtaining the yellow dye compound of the present invention having the formula (I-2) below:

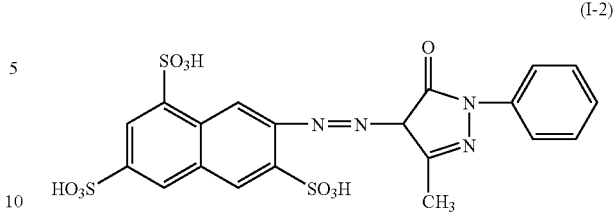

The water-soluble dye in the yellow ink composition of the present invention can be used alone or in a mixture with the aforementioned dyes or alkali metal salts. Preferably, a low content of salt is selected, i.e. the salt content existing in the dye should be below 0.5 wt % based on a total weight of the dye. The dyes with high amount of salts obtained from the preparation and/or the following addition of diluents can further be proceeded with salt exclusion, such as thin-film process (e.g. super filtration, reverse osmosis, or osmosis).

It is not intended to limit the preparation method of the yellow ink composition of the present invention, it can be prepared by a conventional method in mixing all components in a required amount of water.

The examples cited below should not be taken as a limit to the scope of the invention. Wherein the compounds are represented in the form of free acid. However, in practice, they often exist as metallic salts or ammonium salts, and most likely as alkaline metallic salts or ammonium salts. Unless otherwise stated, the parts and percentage used in the following examples are based on weight, and the temperature is in degree Celsius (° C.). The relation between parts by weight and parts by volume is as kilogram and liter.

Example 1

2-naphthylamine-3,6,8-trisulphonic acid (0.0400 mol, 15.32 g) is dissolved in deionized water (50 ml), followed by an addition of HCl (0.1200 mol, 13.7 g), the reaction is kept in 0° C. with ice bath. A solution of nitrite (0.0412 mol, 2.84 g) in deionized water (10 ml) is added by dropwising thereof to the dissolved 2-naphthylamine-3,6,8-trisulphonic acid solution at 0~5° C. After reacting for 60 min, sulfamic acid is added so as to remove excess nitrite.

In a beaker, 1-(2',5'-dichloro-4-sulfophenyl)-3-methyl-5-pyazolone (0.0412 mol, 8.59 g) is dissolved in deionized water (100 ml). Adding the dissolved solution to the prepared diazonium salt solution of 2-naphthylamine-3,6,8-trisulphonic acid at 5 to 10° C. The pH value of the reaction solution is adjusted, with sodium carbonate, to over 8.0, then the reaction solution is stirred for 60 min. Finally, salted-out with NaCl (8% by volume) and then filtrated and dried, thus a compound of formula (I-1) can be obtained.

Example 2

2-naphthylamine-3,6,8-trisulphonic acid (0.0400 mol, 15.32 g) is dissolved in deionized water (50 ml), followed by an addition of HCl (0.1200 mol, 13.7 g), a reaction is kept in 0° C. with ice bath. A solution of nitrite (0.0412 mol, 2.84 g) in deionized water (10 ml) is added by dropwising thereof to the dissolved 2-naphthylamine-3,6,8-trisulphonic acid solution at 0~5° C. After reacting for 60 min, sulfamic acid is added so as to remove the excess nitrite.

In another beaker, 1-phenyl-3-methyl-5-pyazolone (0.0412 mol, 7.18 g) is dissolved in deionized water (100 ml).

Adding the dissolved solution to the prepared diazonium salt solution of 2-naphthylamine-3,6,8-trisulphonic acid at 5 to 10° C. The pH value is adjusted, with sodium carbonate, to over 8.0, then the reaction solution was stirred for 60 min. Finally, salted-out with NaCl (8% by volume) and then filtrated and dried, thus a compound of formula (I-2) can be obtained.

Example 3

2-naphthylamine-3,6,8-trisulphonic acid (0.0400 mol, 15.32 g) is dissolved in deionized water (50 ml), followed by an addition of HCl (0.1200 mol, 13.7 g), the reaction is kept in 0° C. with ice bath. A solution of nitrite (0.0412 mol, 2.84 g) in deionized water (10 ml) is added by dropwising thereof to the dissolved 2-naphthylamine-3,6,8-trisulphonic acid solution at 0~5° C. After reacting for 60 min, sulfamic acid is added so as to remove the excess nitrite.

In still another beaker, 1-(4'-sulfophenyl)-3-methyl-5-pyazolone (0.0412 mol, 10.63 g) is dissolved in deionized water (100 ml). Adding the dissolved solution to the prepared diazonium salt solution of the 2-naphthylamine-3,6,8-trisulphonic acid at 5 to 10° C. The pH value is adjusted, with sodium carbonate, to over 8.0, then the reaction solution is stirred for 60 min. Finally, salted-out with NaCl (8% by volume) and then filtrated and dried, thus a compound of formula (I-3) can be obtained.

Example 4

2-naphthylamine-3,6,8-trisulphonic acid (0.0400 mol, 15.32 g) is dissolved in deionized water (50 ml), followed by an addition of HCl (0.1200 mol, 13.7 g), the reaction is kept in 0° C. with ice bath. A solution of nitrite (0.0412 mol, 2.84 g) in deionized water (10 ml) is added by dropwising thereof to the dissolved 2-naphthylamine-3,6,8-trisulphonic acid solution at 0~5° C. After reacting for 60 min, sulfamic acid is added so as to remove the excess nitrite.

In another beaker, 1-(4-sulphamidophenyl)-3-methyl-5-pyazolone (0.0412 mol, 10.4 g) is dissolved in deionized water (100 ml). Adding the dissolved solution to the prepared diazonium salt solution of 2-naphthylamine-3,6,8-trisulphonic acid at 5 to 10° C. The pH value is adjusted, with sodium carbonate, to over 8.0, then the reaction solution is stirred for 60 min. Finally, salted-out with NaCl (8% by volume) and then filtrated and dried, thus a compound of formula (I-4) can be obtained.

Example 5

2-naphthylamine-3,6,8-trisulphonic acid (0.0400 mol, 15.32 g) is dissolved in deionized water (50 ml), followed by an addition of HCl (0.1200 mol, 13.7 g), the reaction is kept in 0° C. with ice bath. A solution of nitrite (0.0412 mol, 2.84 g) in deionized water (10 ml) is added by dropwising thereof to the dissolved 2-naphthylamine-3,6,8-trisulphonic acid solution at 0~5° C. After reacting for 60 min, sulfamic acid is added so as to remove the excess nitrite.

In still another beaker, 1-(2'-chlorophenyl)-3-methyl-5-pyazolone (0.0412 mol, 8.59 g) is dissolved in deionized water (100 ml). Adding the dissolved solution to the prepared diazonium salt solution of 2-naphthylamine-3,6,8-trisulphonic acid at 5 to 10° C. The pH value was adjusted, with sodium carbonate, to over 8.0, then the reaction solution is stirred for 60 min. Finally, salted-out with NaCl (8% by volume) and then filtrated and dried, thus a compound of formula (I-5) can be obtained.

Example 6

2-naphthylamine-3,6,8-trisulphonic acid (0.0400 mol, 15.32 g) is dissolved in deionized water (50 ml), followed by an addition of HCl (0.1200 mol, 13.7 g), the reaction is kept in 0° C. with ice bath. A solution of nitrite (0.0412 mol, 2.84 g) in deionized water (10 ml) is added by dropwising thereof to the dissolved 2-naphthylamine-3,6,8-trisulphonic acid solution at 0~5° C. After reacting for 60 min, sulfamic acid is added so as to remove the excess nitrite.

In another beaker, 1-(3'-chlorophenyl)-3-methyl-5-pyazolone (0.0412 mol, 8.59 g) is dissolved in deionized water (100 ml). Adding the dissolved solution to the prepared diazonium salt solution of 2-naphthylamine-3,6,8-trisulphonic acid at 5 to 10° C. The pH value was adjusted, with sodium carbonate, to over 8.0, then the reaction solution stirred for 60 min. Finally, salted-out with NaCl (8% by volume) and then filtrated and dried, thus a compound of formula (I-6) can be obtained.

Example 7

2-naphthylamine-3,6,8-trisulphonic acid (0.0400 mol, 15.32 g) is dissolved in deionized water (50 ml), followed by an addition of HCl (0.1200 mol, 13.7 g), the reaction is kept in 0° C. with ice bath. A solution of nitrite (0.0412 mol, 2.84 g) in deionized water (10 ml) is added by dropwising thereof to the dissolved 2-naphthylamine-3,6,8-trisulphonic acid solution at 0~5° C. After reacting for 60 min, sulfamic acid is added so as to remove the excess nitrite.

In still another beaker, 1-(4-sulfophenyl)-3-carboxy-5-pyazolone (0.0412 mol, 11.7 g) is dissolved in deionized water (100 ml). The dissolved solution is added to the prepared diazonium salt solution of 2-naphthylamine-3,6,8-trisulphonic acid at 5 to 10° C. The pH value is adjusted, with sodium carbonate, to over 8.0, then the reaction solution is stirred for 60 min. Finally, salted-out with NaCl (8% by volume) and then filtrated and dried, thus a compound of formula (I-7) can be obtained.

Example 8

2-naphthylamine-3,6,8-trisulphonic acid (0.0400 mol, 15.32 g) is dissolved in deionized water (50 ml), followed by an addition of HCl (0.1200 mol, 13.7 g), the reaction is kept in 0° C. with ice bath. A solution of nitrite (0.0412 mol, 2.84 g) in deionized water (10 ml) is added by dropwising thereof to the dissolved 2-naphthylamine-3,6,8-trisulphonic acid solution at 0~5° C. After reacting for 60 min, sulfamic acid is added so as to remove the excess nitrite.

In another beaker, 1-(4-β-hydroxyethylsulfonylphenyl)-3-methyl-5-pyazolone (0.0412 mol, 10.63 g) is dissolved in deionized water (100 ml). The dissolved solution is added to the prepared diazonium salt solution of 2-naphthylamine-3,6,8-trisulphonic acid at 5 to 10° C. The pH value is adjusted, with sodium carbonate, to over 8.0, then the reaction solution is stirred for 60 min. Finally, salted-out with NaCl (8% by volume) and then filtrated and dried, thus a compound of formula (I-8) can be obtained.

Example 9

Preparation of Yellow Ink Composition (A) 3 parts of compound (I-1), (B) 5 parts of diethylene glycol, 5 parts of diethylene glycol monobutyl ether, 5 parts of glycerin, and (C) water (add to 100 parts) are mixed by a mixer for 30 min, then processed for absolutely-filtration by using a 0.45 µm filter paper so as to obtain a yellow ink composition of the present invention.

Example 10

Preparation of Yellow Ink Composition (A) 3 parts of compound (I-2), (B) 5 parts of diethylene glycol, 5 parts of diethylene glycol monobutyl ether, 5 parts of glycerin, (D) 1 parts of surfactant Surfynol 465, and (C) water (add to 100 parts) are mixed by a mixer for 30 min, then processed for absolutely-filtration by using a 0.45 µm filter paper so as to obtain a yellow ink composition of the present invention.

Example 11

Preparation of Yellow Ink Composition (A) 3 parts of compound (I-3), (B) 5 parts of diethylene glycol, 5 parts of diethylene glycol monobutyl ether, 5 parts of glycerin, (D) 1 parts of surfactant Surfynol 465, (E) 0.3 parts of microbicide Proxel XL2, and (C) water (add to 100 parts) are mixed by a mixer for 30 min, then processed for absolutely-filtration by using a 0.45 µm filter paper so as to obtain a yellow ink composition of the present invention.

Example 12

A yellow ink composition is prepared in a manner similar to that described in Example 11, except that the compound of formula (I-4) is used instead of the compound of formula (I-1).

Example 13

A yellow ink composition is prepared in a manner similar to that described in Example 11, except that the compound of formula (I-5) is used instead of the compound of formula (I-1).

Example 14

A yellow ink composition is prepared in a manner similar to that described in Example 11, except that the compound of formula (I-6) is used instead of the compound of formula (I-1).

Example 15

A yellow ink composition is prepared in a manner similar to that described in Example 11, except that the compound of formula (I-7) is used instead of the compound of formula (I-1).

Example 16

A yellow ink composition is prepared in a manner similar to that described in Example 11, except that the compound of formula (I-8) is used instead of the compound of formula (I-1).

Comparative Example 1

Preparation of Yellow Ink 3 parts of C.I. Acid Yellow 23 (commercially available from Everlight Chemical Industrial Corp.), 5 parts of diethylene glycol, 5 parts of diethylene glycol monobutyl ether, 5 parts of glycerin, 1 parts of surfactant Surfynol 465, 0.3 parts of microbicide Proxel XL2, and water (add to 100 parts) are mixed by a mixer for 30 min, then processed for absolutely-filtration using a 0.45 µm filter paper so as to obtain a yellow ink.

Comparative Example 2

Preparation of Yellow Ink 3 parts of C.I. Direct Yellow 132 (commercially available from Everlight Chemical Industrial Corp.), 5 parts of diethylene glycol, 5 parts of diethylene glycol monobutyl ether, 5 parts of glycerin, 1 parts of surfactant Surfynol 465, 0.3 parts of microbicide Proxel XL2, and water (add to 100 parts) are mixed by a mixer for 30 min, then processed for absolutely-filtration by using a 0.45 µm filter paper so as to obtain a yellow ink.

Comparative Example 3

Preparation of Yellow Ink 3 parts of C.I. Direct Yellow 86 (commercially available from Everlight Chemical Industrial Corp.), 5 parts of diethylene glycol, 5 parts of diethylene glycol monobutyl ether, 5 parts of glycerin, 1 parts of surfactant Surfynol 465, 0.3 parts of microbicide Proxel XL2, and water (add to 100 parts) are mixed by a mixer for 30 min, then processed for absolutely-filtration by using a 0.45 µm filter paper so as to obtain a yellow ink.

Testing of Light-Fastness and the Result Thereof.

Printing Test Condition:

Ink: Ink obtained from Examples 9 to 16 and Comparative Examples 1 to 3.

Printing Paper: Plain Paper.

Printer: EPSONSTYLUS C45 PRINTER.

Printing Strength (Depth): FORMULA: CIE L*a*b*.

Light-Fastness Test Condition:

Pieces of printed paper are illuminated by an xenon arc lamp, with a total illuminating energy of 85KJ, followed by measuring variation of color differences before and after illumination by using an ICS Spectrophotometer, where a higher DE value indicates a larger difference and a poor light-fastness. Judging formula: AATCC and ISO A05.

The test results of ink are as the following Table 1:

TABLE 1

Test Results of Ink

| yellow ink composition | AATCC Light-fastness grade | ISO A05 Light-fastness grade | Strength fading | Solubility |
|---|---|---|---|---|
| Example 9 | 3 | 4 | 20% | 100 g/L |
| Example 10 | 3 | 3-4 | 20% | >120 g/L |
| Example 11 | 2-3 | 4 | 22% | >120 g/L |
| Example 12 | 3-4 | 4 | 19% | 100 g/L |
| Example 13 | 3-4 | 4 | 17% | 100 g/L |
| Example 14 | 3-4 | 4 | 19% | >120 g/L |
| Example 15 | 4 | 4-5 | 12% | >120 g/L |
| Example 16 | 3 | 4 | 19% | 100 g/L |
| Comparative Example 1 | 2-3 | 3-4 | 26% | — |
| Comparative Example 2 | 3-4 | 4 | 4% | 50 g/L |
| Comparative Example 3 | 4-5 | 4-5 | 4% | 80 g/L |

As shown in Table 1, the yellow ink compositions in examples of the present invention possess good light-fastness and excellent solubility, that is superior to the comparative examples in ink jet ink application.

From the foregoing description, the present invention owns differences from conventional technology in several ways, such as purpose, method, function, technology, research and design. Although the present invention has been explained in relation to its preferred examples, it is to be understood that many other possible modifications and variations can be made without departing from the scope of the invention as hereinafter claimed.

What is claimed is:

1. A yellow dye compound of the following formula (I) compound:

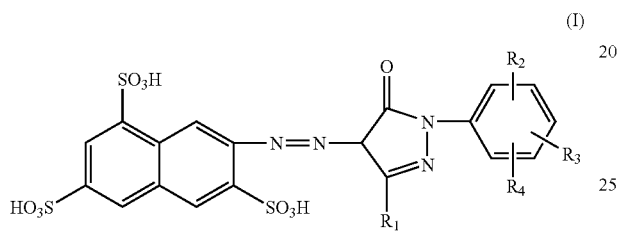

(I)

wherein, $R_1$ is —$CH_3$ or —COOH; each of $R_2$, $R_3$, and $R_4$ independently, is H, —Cl, —$SO_3H$, —$SO_2NH_2$ or —$SO_2CH_2CH_2OH$.

2. The yellow dye compound of claim 1, wherein $R_1$ is —$CH_3$.

3. The yellow dye compound of claim 1, wherein $R_1$ is —COOH.

4. The yellow dye compound of claim 1, wherein said formula (I) compound is the following formula (I-1) compound:

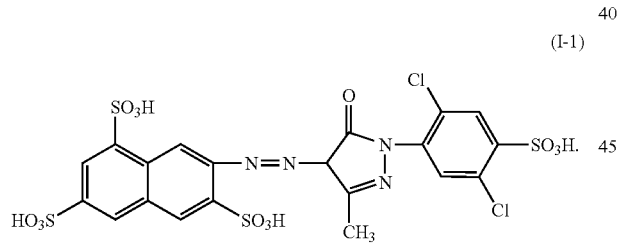

(I-1)

5. The yellow dye compound of claim 1, wherein said formula (I) compound is the following formula (I-3) compound:

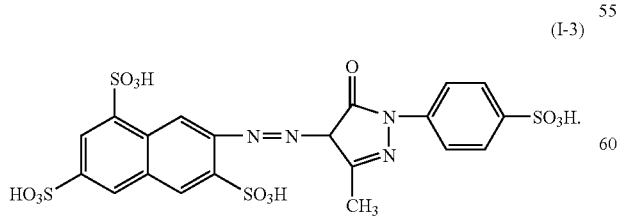

(I-3)

6. The yellow dye compound of claim 1, wherein said formula (I) compound is the following formula (I-7) compound:

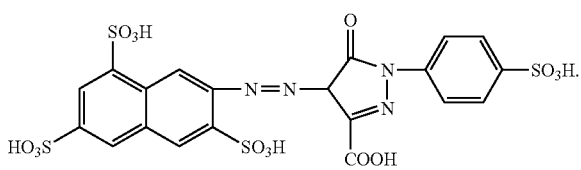

(I-7)

7. A yellow ink composition, comprising:
(A) the yellow dye compound of claim 1, wherein the content of (A) is 0.1~35.0 wt %;
(B) an organic solvent, at which the content of the organic solvent is 5.0~35.0 wt %, is selected from the group consisting of ethylene golycol, diethylene glycol, triethylene glycol, propylene glycol, butylene glycol, ethylene glycol monoethyl ether, ethylene glycol monobutyl ether, diethylene glycol monobutyl ether, diethylene glycol monoethyl ether, diethylene glycol monomethyl ether, triethylene glycol monoethyl ether, triethylene glycol monobutyl ether, glycerin, 2-pyrrolidone, N-methyl-pyrrolidone, 1,3-dimethyl-2-imidazolidinone, and triethanolamine; and
(C) water, the content thereof is 30.0~94.9 wt %.

8. The yellow ink composition of claim 7, wherein $R_1$ is —$CH_3$.

9. The yellow ink composition of claim 7, wherein $R_1$ is —COOH.

10. The yellow ink composition of claim 7, wherein the compound of formula (I) is the following compound of formula (I-1):

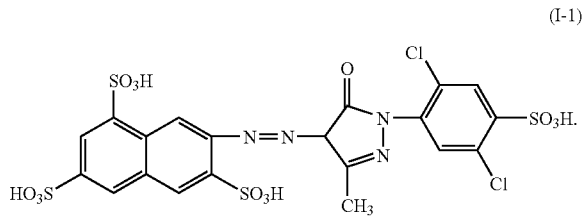

(I-1)

11. The yellow ink composition of claim 7, wherein the compound of formula (I) is the following compound of formula (I-3):

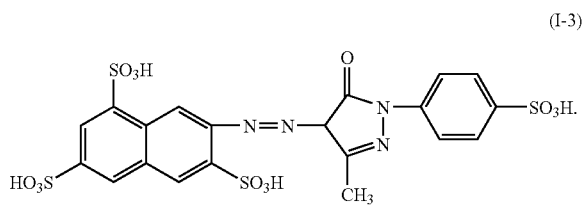

(I-3)

12. The yellow ink composition of claim 7, wherein the compound of formula (I) is the following compound of formula (I-7):

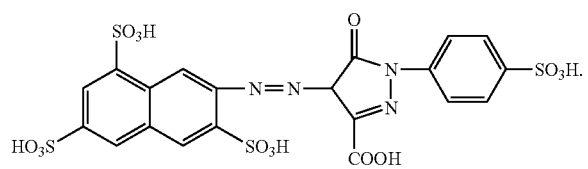
(I-7)
13. The yellow ink composition of claim 7 further comprising a component (D): a nonionic surfactant, where the content of the nonionic surfactant is 0.1~5.0 wt %.
14. The yellow ink composition of claim 13, wherein the nonionic surfactant is an alkynediol-based surfactant or an alkoxy compound surfactant.
* * * * *